INVENTOR.
Walter J. Brown

INVENTOR.
Walter J. Brown.

INVENTOR.
Walter J. Brown.

United States Patent Office 3,524,120
Patented Aug. 11, 1970

3,524,120
CONTROL SYSTEM FOR SERIES WOUND ELECTRIC MOTOR USING A CONTROLLED RECTIFIER AND VOLTAGE STORAGE MEANS THEREFOR
Walter J. Brown, 71 Gurley Road,
Stamford, Conn. 06902
Filed Sept. 15, 1966, Ser. No. 579,756
Int. Cl. H02p 7/06
U.S. Cl. 318—249                                    18 Claims

ABSTRACT OF THE DISCLOSURE

A control system for a series wound motor to be energized from an alternating current supply includes a potential divider for providing a variable alternating current potential to a controlled rectifier coupled to the motor for regulating speed. A capacitor of sufficient capacitance is coupled between the control electrode and cathode of the rectifier to smoothen ripple, suppress transients, cause phase shift, and provide a memory of voltage level between two successive cycles of the A.C. supply.

This invention relates to the speed control of universal or series wound motors in an inexpensive circuit which is capable of providing a substantial degree of regulation of speed against changes of load applied to the motor, as well as providing for adjustment of the motor speed with smooth operation over a very wide range.

The circuit is adapted for energization from an alternating current source which is connected in series with a controlled rectifier and with the field windings and armature winding of the motor, said series-connected elements being connected in one of several sequences in the manner to be described.

Such motors usually have two field windings, but may have four, six or any even number of field windings.

A speed-controlling potential divider is connected across a part or the whole of the said series-connected elements and an adjustable point or tap thereon is connected through a resistor to a control electrode of said controlled rectifier. Furthermore, a capacitor is connected between the control electrode and a power electrode of said controlled rectifier, said power electrode also being connected to a motor winding.

An important feature is that the capacitor is of such magnitude as to provide, with said resistor, a time constant which is comparable with the duration of a half cycle of the alternating current supply; accordingly, the capacitor maintains a voltage which represents a memory of the conditions at the end of any conductive half cycle until the initiation of conduction during the next conductive half cycle; a conductive half cycle is defined as one of such polarity that conduction can occur when initiated by the control electrode. Secondly, the capacitor tends to smooth out ripple due to the interrupted controlled rectifier current and due to the motor commutator.

Thirdly, the same capacitor, when energized by alternating voltage from the potential divider, provides, in conjunction with said resistor, an alternating control voltage at the rectifier control electrode which lags the voltage of the alternating current supply by an amount approaching ninety degrees. The amplitude of said alternating control voltage can be varied from zero upwards by means of the adjustable potential divider; with zero control voltage the rectifier will not conduct and the motor is stationary.

Upon adjusting the potential divider to produce a low alternating control voltage, the rectifier is turned on or "fired" at a late period in each half cycle, thus supplying a small amount of power to the motor which thereby runs slowly. When the potential divider is adjusted to a higher speed position, the amplitude of the alternating control voltage is increased so that the potential required to "fire" the controlled rectifier, is reached sooner in each conductive half cycle and the output of the rectifier to the motor is thereby increased, thus increasing its speed.

Furthermore, when the load applied to the motor is increased, a direct current voltage component, which usually appears across the capacitor, becomes less negative or more positive, and this raises the direct current or zero level of the alternating control voltage, thus causing the control voltage to reach the firing value sooner during each conductive half cycle and thus to increase the rectifier output to the motor, thereby tending to maintain constant motor speed, regardless of load. I have found this to be particularly effective at low motor speed, which is frequently a desirable condition.

These desirable effects have been produced with smooth continuous cyclical firing during every cycle of the alternating current supply over a wide speed range of as much as 250 to 27,000 r.p.m.

When the potential divider tap is set all the way to the end which provides minimum speed, the alternating control voltage is reduced to zero, thus turning off the rectifier and stopping the motor. By providing a line switch which is turned off or on at the extreme minimum voltage position of said tap, line voltage may first be applied through the switch while no current flows, and thereafter the motor may be started by raising the voltage supplied by the potential divider, thus eliminating any heavy current inrush or rupturing current and permitting the use of a smaller switch.

The capacitor-resistor combination has a fourth function of suppressing transient voltages at the rectifier gate.

In the drawings:
FIG. 1 illustrates a circuit according to the invention.
FIGS. 2a–2e show typical approximate voltage waveforms occurring in the arrangement of FIG. 1.
FIG. 3 shows an alternative arrangement of the invention.
FIG. 4 shows a further alternative arrangement.
FIG. 5 is a circuit arrangement for a two-terminal motor.
FIG. 6 is a further alternative arrangement.
FIG. 7 is another circuit incorporating the invention.
FIG. 8 shows the combination of FIG. 1 with a switching device.

In FIG. 1, the conductors 1 and 2 are arranged for connection to an alternating current supply source. Conductor 1 is connected in series with motor field winding 3 to the anode 4 of a controlled rectifier, shown as a silicon controlled rectifier (hereinafter abbreviated as SCR) 5. The cathode 6 of rectifier 5 is connected through field winding 7 and through motor armature winding 8 to conductor 2.

A potential divider 9 is connected across the alternating current source conductors 1 and 2 and it has an adjustable tap 10. The tap 10 is connected through a resistor 11 to the gate or control electrode 12 of the SCR 5.

A capacitor 13 is connected between gate 12 and cathode 6.

When the potential divider tap 10 is at its lowest position 14, no voltage is applied between gate 12 and cathode 6 of SCR 5 and accordingly the SCR will not conduct and the motor is stationary. When the tap 10 is moved slightly upwards, away from position 14, an alternating control signal is applied from the tap through resistor 11 to gate 12. The capacitor 13 is of such magnitude as to retard the phase angle of the voltage at gate 12 relative to the cathode 6 by approximately sixty-five to eighty degrees in relation to the alternating current supply voltage; accordingly, when the tap 10 is raised sufficiently for the positive peak of the alternating current control voltage to reach the required firing voltage level of the SCR gate 12, the SCR will start to conduct about ten to twenty-five degrees before the end of the positive half cycle of anode voltage and will deliver a small output to the motor which thereby runs at a low speed.

By raising the tap further, the alternating current control signal across capacitor 13 increases in amplitude, and this fires the SCR earlier in each cycle and so increases its output and increases the motor speed.

An optional diode 17, which is not necessary for the operation of the circuit, may be connected from gate to cathode of SCR 5 if it is desired to reduce the negative voltage applied to the gate; the diode anode is connected to the SCR cathode.

Typical values for the components of FIG. 1, for a 115 volt 60 cycle source, are:

SCR 5, General Electric C106B
Firing level 0.6 volt 30 microamps at the gate
Potentiometer 9, 10,000 ohms 2 watts
Resistor 11, 27,000 ohms, ¼ watt
Capacitor 13, 0.27 microfarad, +2 −1 volt
Diode 17, 1N645

Motor speeds in revolutions per minute:

| | | | | | |
|---|---|---|---|---|---|
| No load | 250 | 7,000 | 12,000 | 21,000 | 27,000 |
| Full load | 200 | 5,000 | 9,200 | 16,400 | 19,200 |

With this circuit I have produced a valuable feature in that, when the motor load is increased, the firing angle is appreciably advanced so as to increase the rectifier conduction period and thereby the output to the motor; this greatly reduces the drop in speed when the motor is loaded and under some conditions the motor speed is substantially independent of load, especially at low speed as will be seen from the above table.

When overloads are applied to a small motor, the firing angle is in some cases advanced by as much as forty degrees.

This desirable feature is, in the inventor's opinion, attributable to two causes, as follows:

Firstly, upon applying load to the motor, the "D.C.," or average, voltage drop across field winding 3 is increased in proportion to the D.C. motor current which naturally increases with the motor torque requirement to drive the load. Taking conductor 1 as reference potential, the potential at the end 15 of field winding 8 becomes more negative with increased load as indicated by the current flow shown by arrow 16. Accordingly, the potential at rectifier anode 4 also becomes more negative. If it is assumed that the voltage drop from anode-to-cathode remains fixed at a typical value of 1 volt during the conduction period, the cathode potential will then be lowered by the same amount as the increase of voltage drop in field winding 3. Since the voltages in potential divider 9 have not changed, the effective voltage from gate 12 with respect to cathode 6 is raised by this same amount, and this increase is partially stored by capacitor 13 until the commencement of the next conductive half cycle of the alternating current supply; this additional stored potential then acts to fire the gate earlier during the next conductive cycle.

Secondly, it is believed that another effect contributes to the good regulation, especially at low speed when the peak-to-average ratio of anode current is high. When the slowly running motor is loaded, the peak anode current may be so high as to increase the anode-to-cathode drop from say 1 volt to 2 or 3 volts, thus additionally lowering the cathode potential during a conducting period and storing a part of the increase in capacitor 13 and causing earlier firing and increased output during the succeeding half cycle.

The capacitor 13, with its associated resistor 11, is of great importance since it is essential to carry a "voltage memory" forward from one cycle to the next, in order to avoid misfiring. It will also be seen from FIG. 2 that the additional function of capacitor 13 in sustaining a substantially lagging alternating current control voltage is essential to the smooth operation of the circuit over its total speed range down to a no-load, low-speed condition.

Fortunately, the same values of capacitor 13 and of resistance 11 and of the effective resistance of potential divider 9 at its tap 10 serve both these essential functions as well as a third function of smoothing unwanted ripple at the rectifier gate, as will also become apparent on studying FIG. 2; a fourth function is to suppress transient voltages at rectifier gate 12.

The various diagrams in FIG. 2 are reproduced from an oscilloscope study of the voltage waveforms in the circuit of FIG. 1. In each diagram the voltages are identified by the following numerals and line characters:

The dashed lines 2 represent the voltage applied by the alternating current source from anode to cathode of the SCR 5 when said SCR is not conducting; to avoid excessively large diagrams this sinusoidal anode voltage curve is shown to a reduced scale compared with all the other curves.

The zero voltage level with respect to the cathode is denoted by arrows 21.

The solid lines 22 marked "firing level" indicate the voltage which must be applied from gate to cathode of the SCR to initiate conduction or fire the SCR.

Figure 2B:
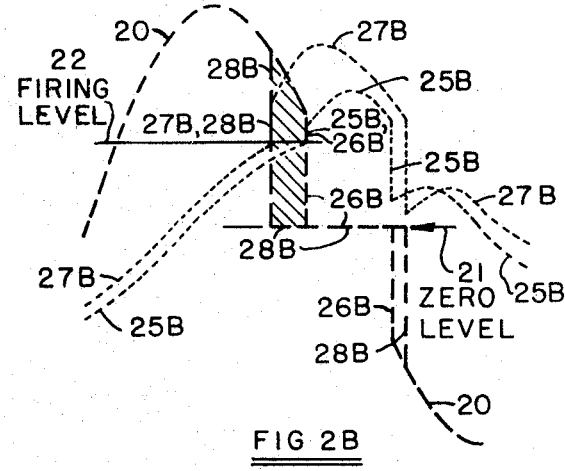
FIGS. 2B, 2C and 2D represent the conditions with three increasing motor speeds.
Figure 2A:
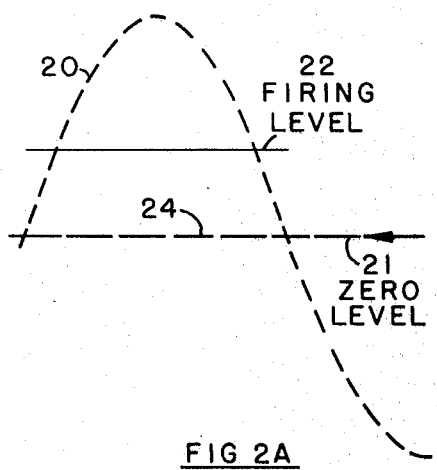
FIG. 2A represents the stationary condition of the motor.

In FIG. 2A the dotted line 24 represents the condition of zero alternating control voltage with the potential divider tap 10 at its lowest position 14; the SCR is non-conducting and the motor is stationary.

The dotted lines 25B, 25C, 25D and 25E represent the gate-to-cathode voltages of the SCR 5 applied by the control circuit for various speeds with no load on the motor.

The dashed lines 26B, 26C, 26D and 26E represent the anode-to-cathode voltages of the SCR during its conducting periods with no load on the motor; in some sections these lines are concurrent with the dotted lines representing gate voltage and those sections are shown in full lines.

The dotted lines 27B, 27C, 27D and 27E represent the gate-to-cathode voltages applied to the SCR when the motor is fully loaded.

The dashed lines 28B, 28C, 78D and 28E represent the anode-to-cathode voltages during the conducting periods of the SCR with the motor fully loaded.

The shaded areas show the increased voltage output from the SCR obtained upon loading the motor.

In the various diagrams of FIG. 2, the small voltage drop from anode to cathode of the SCR during its conduction periods is neglected. In FIG. 2D the gate voltages are shown to a reduced vertical scale.

In the diagrams of FIG. 2, the three effects of capacitor 13, in combination with resistor 11, should be noted.

Firstly, said capacitor carries forward a memory of the gate voltages from one cycle until the next, as will be seen by comparing the relative ordinates of the curves 25 for zero load and the curves 27 for full load. It will be seen that the ordinates of the full load curves 27 are substantially higher than the ordinates of the unloaded curves 25, and that this difference is carried forward from the right hand end of each diagram representing the end of one cycle, to the left hand end of the same diagram, which also represents the conditions during the succeeding positive half cycle of the anode voltage 20. By reason of this memory of the increased ordinates of gate voltage, the SCR is fired at an earlier instant 28 with the motor loaded than the instant 26 with the motor unloaded.

Secondly, the capacitor 13, in conjunction with resistor 11, causes the alternating control voltage 25 or 27 applied to the SCR gate to lag behind the alternating anode voltage 20 by approximately seventy degrees. This permits the motor to start at a low speed as identified in FIG. 2B by the point of intersection of gate voltage 25B with the firing level 22, thus causing the gate to fire approximately one hundred sixty degrees after the anode voltage 20 becomes positive; the SCR then delivers such low power to the motor as to drive it slowly and smoothly by firing during every cycle without misfiring, even at speeds as low as 250 r.p.m. with an unloaded motor having a maximum speed of 27,000 r.p.m.

Figure 2C:
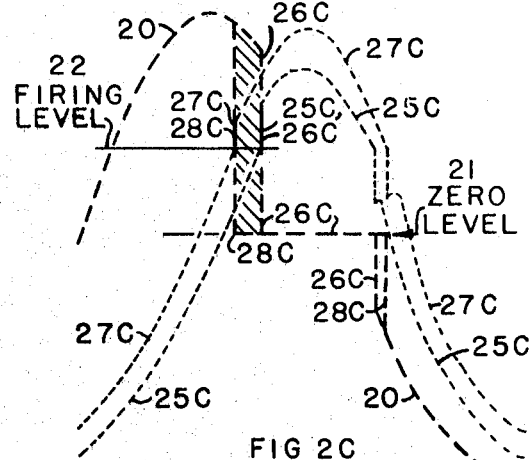
Figure 2E:
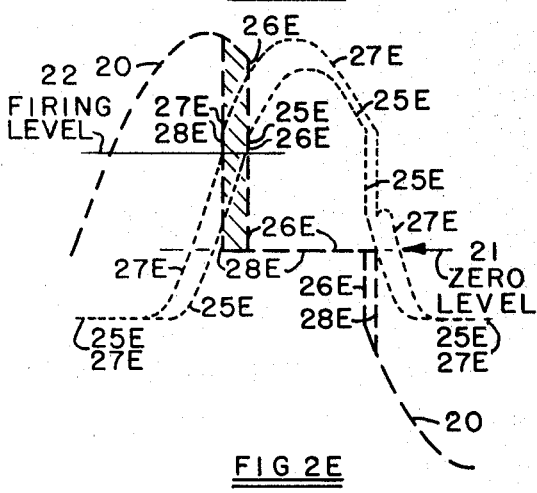
FIG. 2E depicts an alternative condition to that of FIG. 2C, in which negative control voltage is inhibited by diode 17.
Figure 2D:
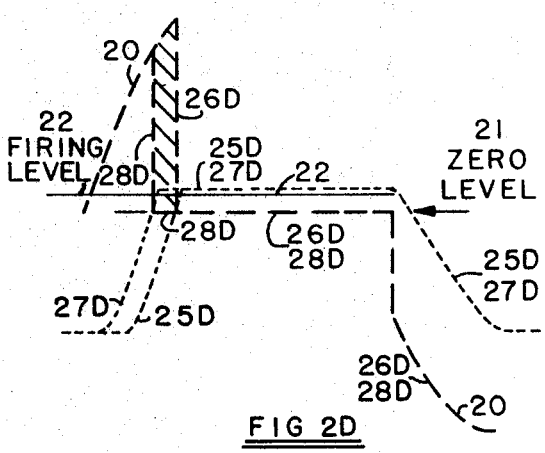

Thirdly, the capacitor 13 filters and smooths the severe ripple which occurs in the motor circuit when the SCR suddenly initiates conduction; this will be seen from FIGS. 2B, 2C and 2E, as evidenced by the relatively small distortion or displacement of the gate voltage curves 25 and 27 during the periods of anode conduction; this distortion is sufficiently low to permit recovery of the gate voltage to its normal sinusoidal form before the right hand end of the diagrams and well before the next firing point.

Fourthly, although not evident from FIG. 2, the combination of resistor 11 and capacitor 13 acts as a low pass filter which suppresses and almost completely eliminates high frequency transisent voltage which could otherwise be applied destructively to the sensitive rectifier gate 12 due to high voltage line transients occurring between the alternating supply conductors 1 and 2.

Referring back to FIG. 1, the origin of the distortion of the alternating control signal, due to firing of the SCR, is believed by the inventor to be minimized by connecting one-half of the field windings in series with the SCR anode and the other half of said field windings in series with the SCR cathode, thus providing at least partial neutralization of unwanted ripple in the control circuit 10, 11, 12, 13.

Figure 1:
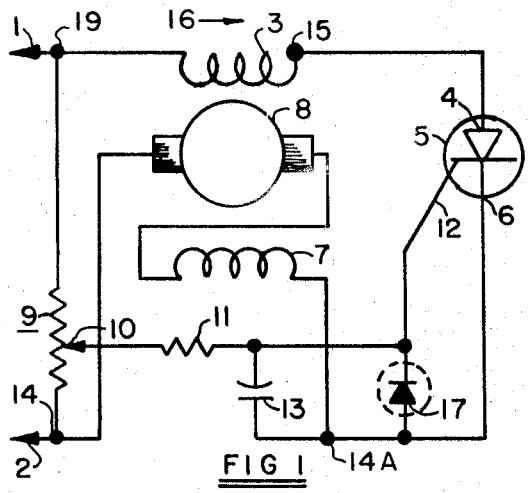

In FIG. 1, the motor terminal connections are at points 19 and 15, 14 and 14A.

Figure 3:
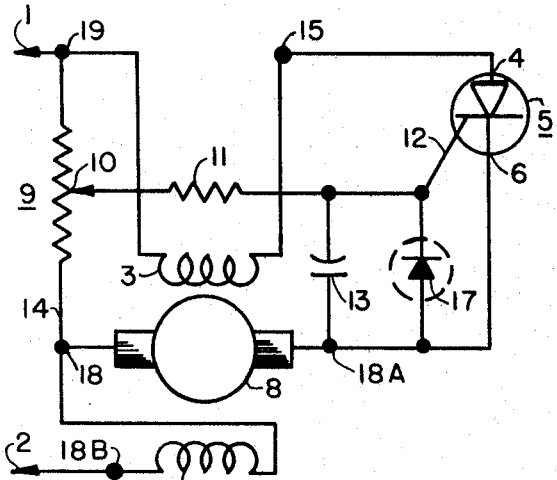

FIG. 3 shows an alternative arrangement to that of FIG. 1, in which several of the elements have similar functions and are similarly numbered. In FIG. 3, however, the sequence of connections of the motor windings and the SCR differs from FIG. 1.

In FIG. 3 the alternating current supply conductor 1 is connected in series with a first motor field winding 3 to the anode 4 of the SCR 5. The SCR cathode 6 is connected through armature winding 8 and thence through a common point 18 and through a second field winding 7 to the supply conductor 2. The potential divider 9 is connected between the supply conductor 1 and the common point 18. Accordingly, said second field winding is outside the feedback loop comprising the first field winding 3, the SCR 5, the armature 8 and the potential divider 9; said second field winding tends to smoothen the ripple in said feedback loop.

In FIG. 3, the motor terminal connections are at points 19, 15 and 18, 18A, 18B.

Figure 4:
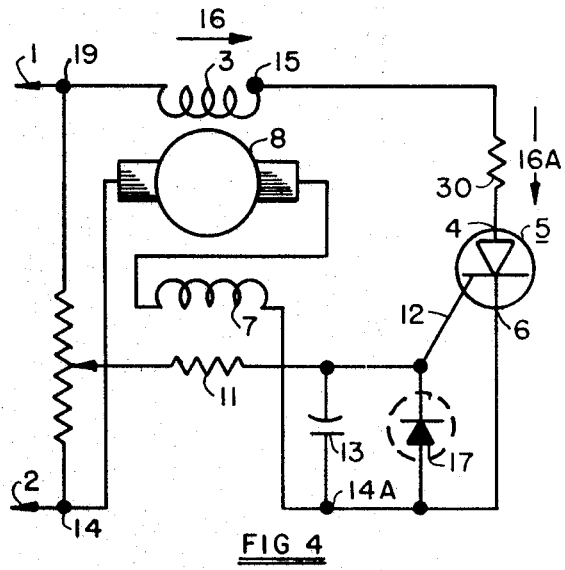

FIG. 4 is similar to FIG. 1 except that a resistor 30 of low ohmic value is connected in series with the field winding 3 between the conductor 1 and the anode 4 of SCR 5. The voltage drop in said resistor 30 is thereby added to the drop in said field winding 3 on account of the motor current flowing through the resistor in the direction indicated by arrow 16A. The increased total voltage drop tends to lower the potential of SCR anode 4, and that of cathode 6 during the conducting periods, more than in FIG. 1. Accordingly the potential which is stored by capacitor 13 and applied to gate 12 reaches the firing level earlier than in FIG. 1 and causes the SCR to fire at a still earlier point in the half cycle when a load is applied to the motor, thus improving the speed regulation of the motor.

As in FIG. 1 and also in FIG. 3, the capacitor 13 and its associated resistor 11 perform the fourfold function of providing a "voltage memory," of developing a well-retarded alternating current control voltage, of smoothing ripple at the SCR gate, and of suppressing voltage transients at the rectifier gate 12.

In FIG. 4 the motor terminals or connections are at points 19, 15 and 14, 14A.

Figure 5:
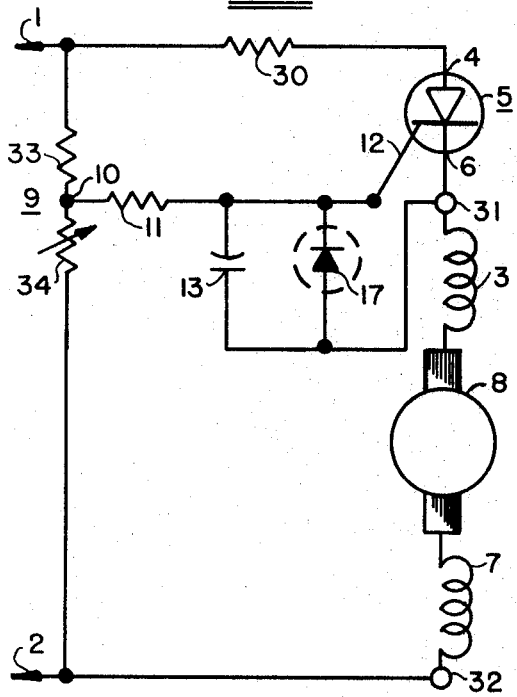

FIG. 5 shows a speed regulating circuit for use with a conventional motor having only two terminal connections, 31 and 32, in contrast with the other circuits described which require additional motor terminal connections. In FIG. 5, a resistor 30 is serially connected between the alternating current supply conductor 1 and the SCR anode 4. The SCR cathode 6 is serially connected through terminal or connection point 31 and thence through the field winding 3, the armature 8, the field winding 7, and terminal or connection point 32, to the alternating current supply conductor 2.

The potential divider 9 is connected across the supply conductors 1 and 2, as in FIG. 1, and a similar control circuit supplies a lagging alternating control voltage to the SCR gate 12 by means of the series resistor 11 connected between tap 10 and gate 12, together with the capacitor 13 which is connected from gate 12 to cathode 6 and performs the same four functions as previously described. The potential divider 9 is shown as a fixed resistor 33 serially connected through the tap 10 to a rheostat 34.

The voltage drop in resistor 30 provides the necessary reduction of anode and cathode voltages in SCR 5 during its conducting period to cause the SCR to fire earlier as a result of the potential storage in capacitor 11 and deliver a higher voltage as the motor load is increased.

If desired, the field windings 3 and 7 may be serially connected to one end of the armature; in this event, the two field windings may be connected in parallel with each other and the parallel combination thereof is then connected in series with one end of the armature.

Figure 6:
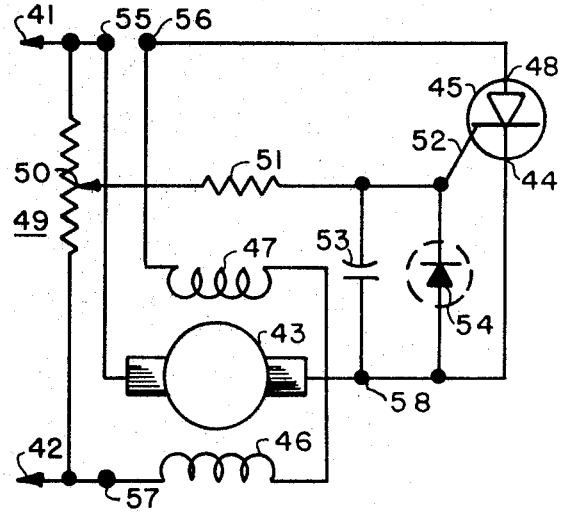

FIG. 6 shows a further alternative arrangement of the invention for use with a motor having four terminals or connections.

Conductors 41 and 42 are arranged for connection to an alternating current supply source. Conductor 41 is connected through armature 43 to the cathode 44 of SCR 45. Conductor 42 is connected through all the field windings 46 and 47 of the motor to SCR anode 48. Alternatively, the field windings may be connected in parallel with each other between terminals or connections 56 and 57.

Potential divider 49, having a tap 50, is connected between conductors 41 and 42. The tap 50 is connected through resistor 51 to SCR gate 52. Capacitor 53 and optional diode 54 are connected from gate to cathode of SCR 45, with the diode cathode connected to the SCR gate to limit the application of negative voltage to said gate 52.

The capacitor 53, with its associated resistor 51, provides sufficient time constant to perform the four functions described with reference to FIGS. 1 and 2.

The motor terminals or connections are at points 55, 56, 57 and 58.

Figure 7:
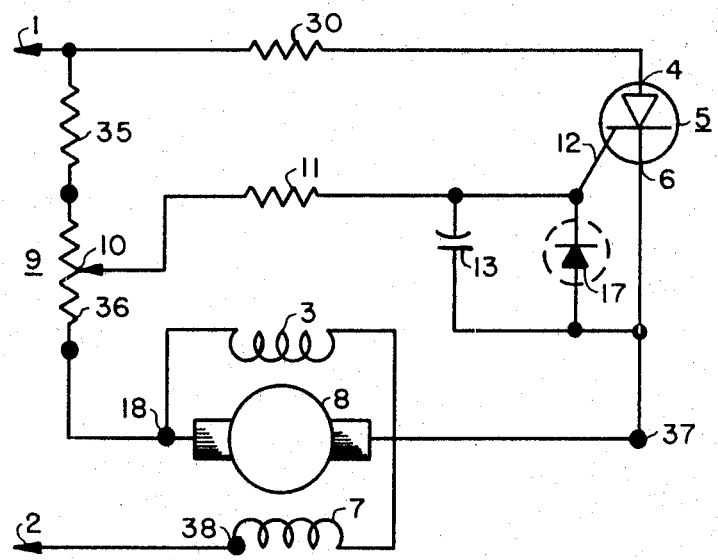

FIG. 7 shows a further arrangement in which a resistor 30 is connected between the alternating current supply conductor 1 and the anode 4 of SCR 5. The SCR cathode 6 is serially connected through armature winding 8, common point 18, and field windings 3 and 7 to supply conductor 2. The potential divider 9 is connected between the alternating current supply conductor 1 and the common point 18 of the armature and field windings. The potential divider is shown as a fixed resistor 35 serially connected with a potentiometer 36 which has a tap 10 connected through resistor 11 to SCR gate 12.

Three motor terminals or connections are provided, at points 37, 18 and 38. It will be noted that the field windings 3 and 7 are outside the feedback loop 1, 30, 5, 8, 36 and 35 and said windings serve to smoothen the ripple in said loop and across the control circuit 10, 11, 13 and 12.

In FIGS. 1, 3, 4 and 6, the potential divider 9 or 49 is shown as a simple potentiometer which in practice provides the full range of speed control with a relatively small movement of its slider or tap. This is an advantage in certain applications, such as when the potentiometer is controlled by a foot pedal or a hand trigger having limited mechanical movement. Alternative arrangements of the potential divider 9 are shown in FIGS. 5, 7 and 8.

Figure 8:
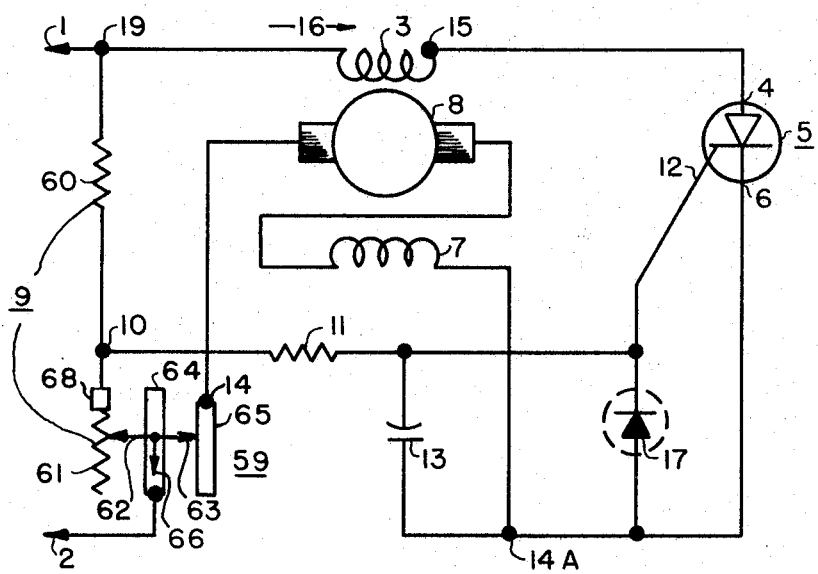

FIG. 8 shows the basic circuit of FIG. 1 in combination with a switching device 59 having useful properties in its application to hand trigger controls for electric portable tools and appliances. The potential divider 9 in this arrangement comprises the series combination of a fixed resistor 60 and a rheostat 61 with a tap 10 therebetween. Said series combination is connected between the alternating current conductors 1 and 2, through the rheostat sliding contact 62, and the sliding contact 66, and the metallic contact strip 64; the sliding contacts 62, 66 and 63 are electrically and mechanically connected so that they all slide upwards or downwards together, as viewed in the drawing; in practice they may be moved simultaneously by a hand trigger or a foot pedal control.

In FIG. 8 the said sliding contacts are shown in their mid position corresponding to a medium motor speed. When said sliding contacts are moved to their lowest position, the control voltage at the tap 10, and therefore at SCR gate 12, is increased and the motor will run at high speed. When said sliding contacts are moved to their highest position the control voltage at tap 10 and thence at SCR gate 12 is reduced to zero and the motor will stop.

The switching device 59 has an additional metallic contact strip 65 which is engaged by the sliding contact 63. The sliding contacts 62, 66 and 63, and the contact strips 64 and 65, are so dimensioned that when said sliding contacts are moved upwards, the resistance of the rheostat 61 is first reduced substantially to zero so as to turn off the SCR; with further upward movement the sliding contacts 663 and 66 open the connection between strips 64 and 65, thus breaking the alternating current supply circuit to the motor while no current is flowing; still further ward movement disconnects the sliding contact 62 from the upper end 68 of the rheostat.

In this way the switch in the alternating current supply circuit does not have to interrupt or initiate any appreciable current when it is opened or closed; it should be noted that the single group of three mechanically and electrically interconnected sliding contacts can be constructed as a single slider with three contact points 62, 66 and 63.

The arrangements illustrated in FIGS. 1, 3, 4, 5, 6, 7 and 8 each include two field windings which are adequate for a two-pole motor. If the motor is multipolar with $2n$ poles, then each single field winding shown in the drawing should be replaced by $n$ field windings interconnected in series or in parallel with each other or in a series-parallel group.

Also in FIGS. 1, 3, 4, 5, 6, 7 and 8, the circuit elements are shown as discrete components connected by conductors. However, the control circuit is of such simplicity as to be readily reproducible as an integrated circuit.

Other variations may be introduced within the scope of the invention. For instance, the device which has been illustrated as a silicon controlled rectifier may be a germanium or other controlled rectifier, or it may be a power transistor. The control electrode may be the gate of an SCR or the base of a power transistor, and in either event a current-limiting resistor may be connected between said control electrode and the capacitor which delivers the lagging alternating control signal.

Regardless of whether the semiconductor device is of the switching type, such as an SCR or a device of variable conductivity such as a power transistor, the control circuits hereinbefore described are capable of proportionally controlling the flow of electric power to the motor. This is due to the combined effect of the capacitor and resistor shown typically as 13 and 11 in FIG. 1 in developing a control signal having a lagging alternating current component and also in storing sufficient of the direct current signal level from each cycle to the next cycle. These features, as illustrated in FIG. 2, insure repetitive conduction once in every cycle, in contrast with systems which turn a rectifier on and off intermittently, like a switch, at a variable rate.

Furthermore, on account of the relatively long time constant of the capacitor 13 and resistor 11, the signal voltage which is partially stored until the next cycle is dependent upon the average value of the motor winding voltage during the conducting periods, in contrast with systems which depend upon the much smaller random counter electromotive force which is developed due to residual field during the non-conducting periods of the rectifier.

What I claim is:

1. A control system for a series wound electric motor having an armature winding and at least one field winding, and with first and second conductors for connection to an alternating current supply, comprising:
    a controllable semiconductor device having a control electrode and first and second power electrodes;
    a first series circuit which includes said armature winding connected from said first power electrode to said first supply conductor;
    a second series circuit which includes said field winding connected from said second power electrode to said second supply conductor;
    the remainder of any field windings being connected into one of said series circuits;
    a control circuit comprising a resistive potential divider connected directly across at least a part of said series circuits and said semiconductor power electrodes, and having a tap thereon;
    resistive means connected between said tap and said semiconductor control electrode; and
    capacitive means connected effectively between said control electrode and a power electrode of said semiconductor device;
    said capacitive means being of sufficient capacitance to smoothen unwanted ripple and to suppress voltage transients at said control electrode, to provide a capacitive reactance for developing an alternating control voltage which substantially lags the alternating current supply voltage, and to store a memory of the voltage level at said control electrode from each cycle of the alternating current supply to the next cycle whereby to assure recurring proportional conduction through said semiconductor device during every succeeding cycle.

2. A control system for a series wound electric motor having an armature winding and at least one field winding, and with first and second conductors for connection to an alternating current supply, comprising:
    a controllable semiconductor device having a control electrode and first and second power electrodes;
    a resistive element;
    a first series circuit which includes said armature winding connected from said first power electrode to said first supply conductor;
    a second series circuit which includes said resistive element connected from said second power electrode to said second supply conductor;
    said one field winding being connected into one of said series circuits;
    a control circuit comprising a resistive potential divider connected directly across at least a part of said series circuits and said semiconductor power electrodes, and having a tap thereon for supplying an alternating voltage to said control electrode;

resistive means connected between said tap and said semiconductor control electrode; and capacitive means connected effectively between said control electrode and a power electrode of said semiconductor device;

said capacitive means being of sufficient capacitance to smoothen unwanted ripple and to suppress voltage transient at said control electrode, to provide a capacitive reactance for developing an alternating control voltage which substantially lags the alternating current supply voltage, and to store a memory of the voltage level at said control electrode from each cycle of the alternating current supply to the next cycle whereby to assure recurring proportional conduction through said semiconductor device during every succeeding cycle.

3. The combination of claim 1 in which said resistive and capacitive means are electrically so dimensioned that their time constant, as defined by the product of resistance in ohms and capacitance in farads, is at least one-quarter of the duration of one cycle of said alternating current supply.

4. The combination of claim 1 in which said resistive and capacitive means are electrically so dimensioned as to develop across said capacitive means an alternating control voltage which lags the voltage of said alternating current supply by more than forty-five degrees.

5. The combination of claim 1 in which the remainder of said field windings is connected into said first series circuit.

6. The combination of claim 1 in which the remainder of said field windings is connected into said second series circuit.

7. The combination of claim 1 in which said first series circuit comprises said armature and the remainder of said field windings, and said potential divider is connected across said alternating current supply conductors.

8. The combination of claim 1 in which said potential divider is connected across the series combination of said armature winding, said first and said second semiconductor power electrodes and a part only of said field windings.

9. The combination of claim 6 in which said potential divider is connected across the series combination of said first series circuit, said semiconductor power electrodes, and said second series circuit.

10. The combination of claim 2 in which said one field winding is connected into said second series circuit, and the remainder of any field windings is connected into said first series circuit, and said potential divider is connected across said alternating supply conductors.

11. The combination of claim 2 in which said one field winding and any remaining field windings are connected into said first series circuit, and said potential divider is connected across said alternating current supply conductors.

12. The combination of claim 2 in which said one field winding and any remaining field windings are connected into said first series circuit and said potential divider is connected across the series combination of said armature, said first and second semiconductor power electrodes, and said resistive power element.

13. The combination of claim 1 including a diode connected across said capacitive means with such polarity as to inhibit the application of reverse signal voltage to said semiconductor control electrode.

14. The combination of claim 1 and including switching means which, upon operation, first connects said potential dividers, when in its zero speed position, to said alternating current supply, and then connects said series power circuit to said supply, and subsequently varies said potential divider to start said motor and increase its speed to a desired value.

15. A speed-regulated motor drive as set forth in claim 1, said potential divider comprising a fixed resistor extending from one side of said tap and a rheostat from the other side of said tap, and a switching device disposed and coupled to coact with the sliding contact of said rheostat;

said switching device including a first and a second metallic strip, and a pair of sliding contacts, one associated with each of said metallic strips;

said first metallic strip adapted to be connected to one side of the alternating current supply;

said second metallic strip adapted to be connected to form an input terminal to said series power circuit;

the sliding contact of said rheostat and those associated with said metallic strips being electrically interconnected and coupled for motion in unison, and arranged for causing, responsive to the motion of said contacts from an OFF position to the ON position, the electric current from the alternating current supply to said series power circuit to be completed first through said strips and contacts associated with said strips while the rheostat setting is such as to cause no substantial power to occur in said series power circuit, and continuing motion of said contacts varies the setting of the rheostat to increase power flow through said series power circuit;

whereby to minimize the electrical power which must be initiated or interrupted by said switching device.

16. The combination of claim 2 in which said resistive and capacitive means are electrically so dimensioned that their time constant, as defined by the product of resistance in ohms and capacitance in farads, is at least one-quarter of the duration of one cycle of said alternating current supply.

17. The combination of claim 2 in which said resistive and capacitive means are electrically so dimensioned as to develop across said capacitive means an alternating control voltage which lags the voltage of said alternating current supply by more than forty-five degrees.

18. The combination of claim 2 including a diode connected across said capacitive means with such polarity as to inhibit the application of reverse signal voltage to said semiconductor control electrode.

References Cited

UNITED STATES PATENTS

| | | | |
|---|---|---|---|
| 2,939,064 | 5/1960 | Momberg et al. | 318—246 |
| 3,084,319 | 4/1963 | Hooijkamp | 318—356 |
| 3,222,583 | 12/1965 | Gutzwiller | 318—246 |
| 3,283,235 | 11/1966 | Auld et al. | 318—246 |
| 3,309,594 | 3/1967 | Belt et al. | 318—246 |

OTHER REFERENCES

General Electric S.C.R. Manual—third edition, publication date Mar. 23, 1964, pp. 49, 50, 142, 143 and 144.

ORIS L. RADER, Primary Examiner

K. L. CROSSON, Assistant Examiner

U.S. Cl. X.R.

318—345, 356